United States Patent
Lin (10) Patent No.: US 6,867,950 B1
(45) Date of Patent: Mar. 15, 2005

(54) CLEATING FEATURES TO IMPROVE ADHESIVE INTERFACE BETWEEN A BOBBIN AND A COIL OF AN ACTUATOR COIL PORTION OF A HARD DISK DRIVE

(75) Inventor: Chen-Chi Lin, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 77 days.

(21) Appl. No.: 10/355,834

(22) Filed: Jan. 31, 2003

(51) Int. Cl.$^7$ ............................................. G11B 5/596
(52) U.S. Cl. ................................................... 360/265.8
(58) Field of Search ..................................... 360/265.8

(56) References Cited

U.S. PATENT DOCUMENTS

| | | | |
|---|---|---|---|
| 6,683,756 B1 * | 1/2004 | Zhao et al. ............... | 360/265.8 |
| 6,787,941 B2 * | 9/2004 | Takashima ............... | 360/265.8 |
| 2002/0054458 A1 | 5/2002 | Subrahmanyan | |

* cited by examiner

Primary Examiner—Robert S. Tupper
(74) Attorney, Agent, or Firm—Won Tae C. Kim, Esq.; Milad G. Shara, Esq.; Young Law Firm (57) ABSTRACT

A disk drive includes a disk, and a head stack assembly for reading and writing to the disk. The head stack assembly may include a body portion defining a through bore that defines a pivot axis; an actuator arm cantilevered from the body portion; a head gimbal assembly coupled to the actuator arm; a coil portion cantilevered from the body portion in an opposite direction from the actuator arm and a bobbin. The coil portion may define first and second actuator fork members and may include a wound coil supported by the first and second actuator fork members. The bobbin may be configured to stiffen the coil, and may include a first surface that faces the coil and that defines the thickness of the bobbin. The first surface defines one or more cleating features configured to increase the surface area of the first surface. The largest dimension of each of the cleating features in a direction that is parallel to the pivot axis may be selected to be less than the thickness of the bobbin. An adhesive may be disposed between the first surface of the bobbin and the coil.

24 Claims, 7 Drawing Sheets

CLEATING FEATURES TO IMPROVE ADHESIVE INTERFACE BETWEEN A BOBBIN AND A COIL OF AN ACTUATOR COIL PORTION OF A HARD DISK DRIVE

BACKGROUND OF THE INVENTION

1. Field of the Invention

This invention relates to magnetic disk drives. In particular, embodiments of the present invention relate to disk drives, head stack assemblies and actuator arm assemblies that include a bobbin that defines one or more cleating features at the interface of the bobbin and the wound coil of the actuator coil portion.

2. Description of the Prior Art and Related Information

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

Figure 1:
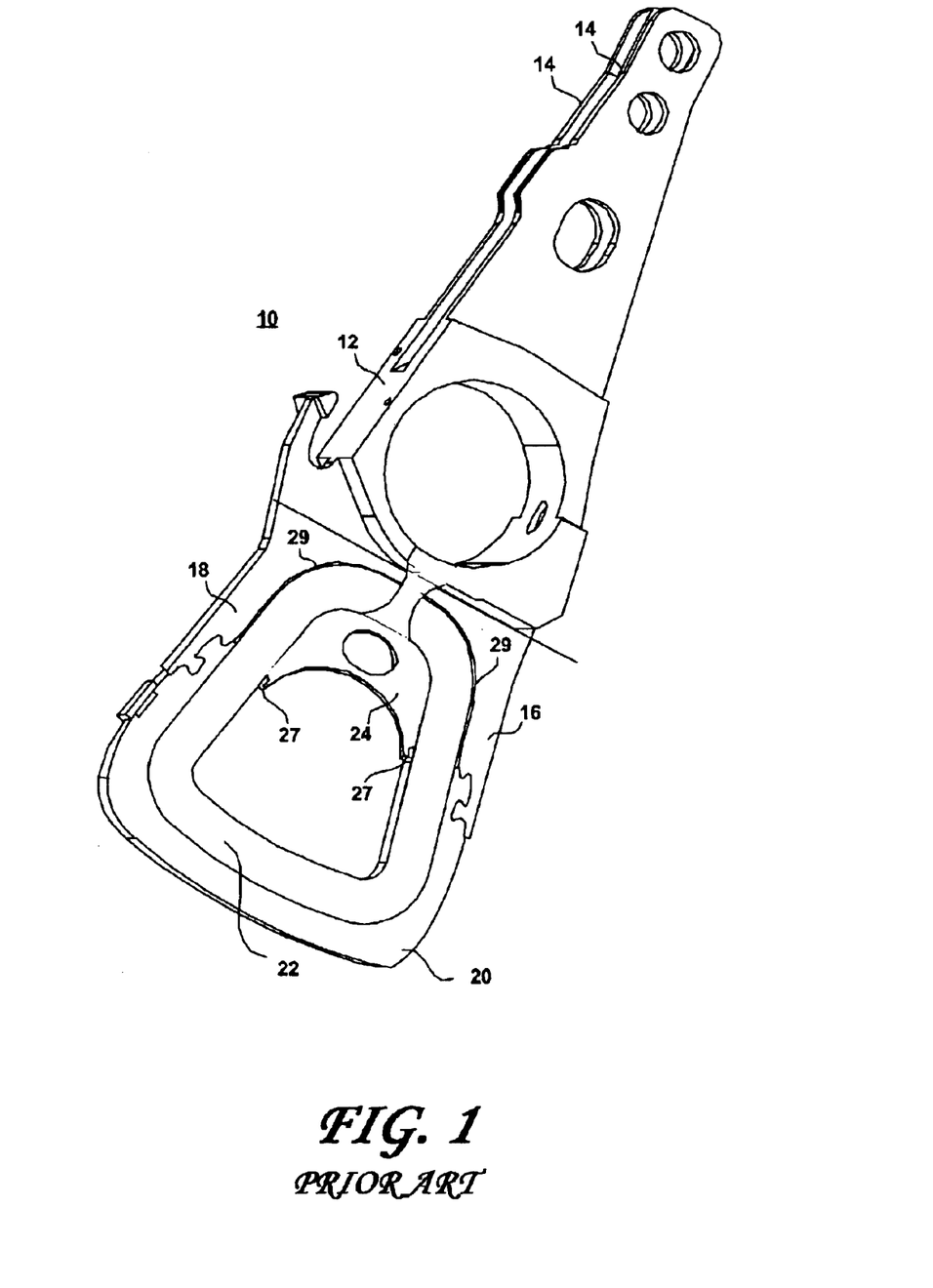
FIG. 1 shows a conventional actuator assembly.

FIG. 1 shows an example of a conventional actuator assembly 10. As shown therein, the conventional actuator assembly 10 includes a body portion 12 from which are cantilevered one or more actuator arms 14. Also cantilevered from the actuator body portion 12 is a coil portion that includes first and second actuator fork members 16 and 18. The actuator fork members 16 and 18 support the wound coil 22 that forms a portion of the disk drive's actuator coil portion. The wound coil 22 is also at least partially encased by a plastic overmold 20, which serves to further support and add rigidity to the coil 22 and actuator assembly 10. The wound coil 22 is bonded to the actuator arms 16, 18 by a layer of adhesive, shown in FIG. 1 at 29. As shown, the actuator assembly 10 also includes a bobbin 24, which is secured to the coil 22 by adhesive bumps at 27 that are located at the tips of the bobbin 24. The bobbin 24 further increases the rigidity of the coil 22 and that of the actuator assembly 10.

The overmold 20 is formed using a plastic injection molding process at high temperatures. As it cools, the overmold 20 may form voids within its thickness. Such voids adversely affect the resulting rigidity of the overmold and that of the overall actuator assembly. While such decreased rigidity may nevertheless fall within acceptable operational parameters for drives destined for the consumer market, such decreased rigidity may adversely affect the operation of the higher performing drives aimed at the enterprise market. Indeed, the higher data densities and higher rotational platter rotational speeds of such drives require a very rigid (stiff) actuator assembly, in which the bending, torsional, sway and system modes are shifted to higher frequencies.

As the actuator assembly 10 is not and cannot be made to be perfectly stiff, these resonant modes occur as the actuator assembly 10 vibrates in response to a given excitation frequency or frequency range. Stiffening the actuator assembly 10, all other aspects thereof remaining the same, tends to beneficially increase the frequencies at which such vibrations occur and tends to beneficially reduce the amplitude of such vibrations. The stiffer the actuator assembly 10 can be made, the higher the frequencies will be at which it will vibrate responsive to a given excitation frequency or frequency range.

Such resonant modes interfere with the drive's reading and writing activities, and typically degrade the drive's seek time performance. To address such resonant modes, a notch filter or filters tuned to the resonant mode frequencies may be used in the drive's servo to attenuate signals at these frequencies, to the detriment of available servo bandwidth. Moreover, it is easier to attenuate higher frequencies without unacceptable loss of signal amplitude, as it is to attenuate unwanted resonant mode frequencies at comparatively lower frequencies. From the foregoing, it may be appreciated that there is a clear need for shifting the resonant mode frequencies higher and/or to eliminate one or more resonant modes of actuator assemblies of hard disk drives. Doing so would decrease drive seek times, decrease the degradation of servo bandwidth caused by such resonant modes, among other benefits.

SUMMARY OF THE INVENTION

An embodiment of the present invention may be regarded as a disk drive, comprising a disk and a head stack assembly for reading and writing to the disk. The head stack assembly may include a body portion defining a through bore that defines a pivot axis; an actuator arm cantilevered from the body portion; a head gimbal assembly coupled to the actuator arm; a coil portion cantilevered from the body portion in an opposite direction from the actuator arm, the coil portion defining first and second actuator fork members and including a wound coil supported by the first and second actuator fork members; a bobbin configured to stiffen the wound coil, the bobbin including a first surface that faces the wound coil and that defines a thickness of the bobbin, the first surface defining a plurality of cleating features configured to increase a surface area of the first surface, the largest dimension of each of the plurality of cleating features in the direction parallel to the pivot axis being less than the thickness of the bobbin. An adhesive may be disposed between the first surface of the bobbin and the wound coil.

The cleating feature may define a through bore configured to allow the adhesive to flow therethrough. The through bore may define a through bore axis that is substantially parallel to the pivot axis or may define a through bore axis that is substantially perpendicular to the pivot axis, for example (other orientations of the through bore axis being possible). One or more of the plurality of cleating features may define an extrusion relative to the first surface of the bobbin and/or may define a recess relative thereto. One edge of one or more of the plurality of cleating features may be aligned with an edge of the first surface of the bobbin. One or more of the plurality of cleating features may be disposed between two substantially flat portions of the first surface.

Other embodiments of the present invention include a head stack assembly for reading and writing to a disk of a disk drive, comprising: a body portion defining a through bore that defines a pivot axis, an actuator arm cantilevered from the body portion; a head gimbal assembly coupled to the actuator arm; a coil portion cantilevered from the body portion in an opposite direction from the actuator arm, the coil portion defining first and second actuator fork members and including a wound coil supported by the first and second actuator fork members; a bobbin configured to stiffen the wound coil, the bobbin including a first surface that faces the wound coil and that defines a thickness of the bobbin, the first surface defining a plurality of cleating features configured to increase the surface area of the first surface, the largest dimension of each of the plurality of cleating features in the direction parallel to the pivot axis being less than the thickness of the bobbin. An adhesive may be disposed between the first surface of the bobbin and the wound coil.

The cleating feature may define a through bore configured to allow the adhesive to flow therethrough. For example, the through bore may define a through bore axis that is substantially parallel to the pivot axis or substantially perpendicular to the pivot axis, other through bore axis orientations being possible. One or more of the plurality of cleating features may define an extrusion relative to the first surface of the bobbin and/or a recess relative to the first surface of the bobbin. One edge of one or more of the plurality of cleating features may be aligned with an edge of he first surface of the bobbin. One or more of the plurality of cleating features may be disposed between two substantially flat portions of the first surface.

According to a still further embodiment, the present invention may be an actuator arm assembly for a disk drive, comprising: a body portion defining a through bore that defines a pivot axis; an actuator arm cantilevered from the body portion; a coil portion cantilevered from the body portion in an opposite direction from the actuator arm, the coil portion defining first and second actuator fork members and including a wound coil supported by the first and second actuator fork members; a bobbin configured to stiffen the wound coil, the bobbin including a first surface that faces the wound coil and that defines a thickness of the bobbin, the first surface defining a plurality of cleating features configured to increase a surface area of the first surface, a largest dimension of each of the plurality of cleating features in a direction parallel to the pivot axis being less than the thickness of the bobbin. An adhesive may be disposed between the first surface of the bobbin and the wound coil.

The cleating feature may define a through bore configured to allow the adhesive to flow therethrough. The through bore may define a through bore axis that is substantially parallel to the pivot axis or that is substantially perpendicular to the pivot axis, other orientations of the through bore axis being possible. One or more of the plurality of cleating features may define an extrusion relative to the first surface of the bobbin and/or a recess relative to the first surface of the bobbin. One edge of one or more of the plurality of cleating features may be aligned with an edge of the first surface of the bobbin. One or more of the plurality of cleating features may be disposed between two substantially flat portions of the first surface.

DESCRIPTION OF PREFERRED EMBODIMENTS

Figure 2:
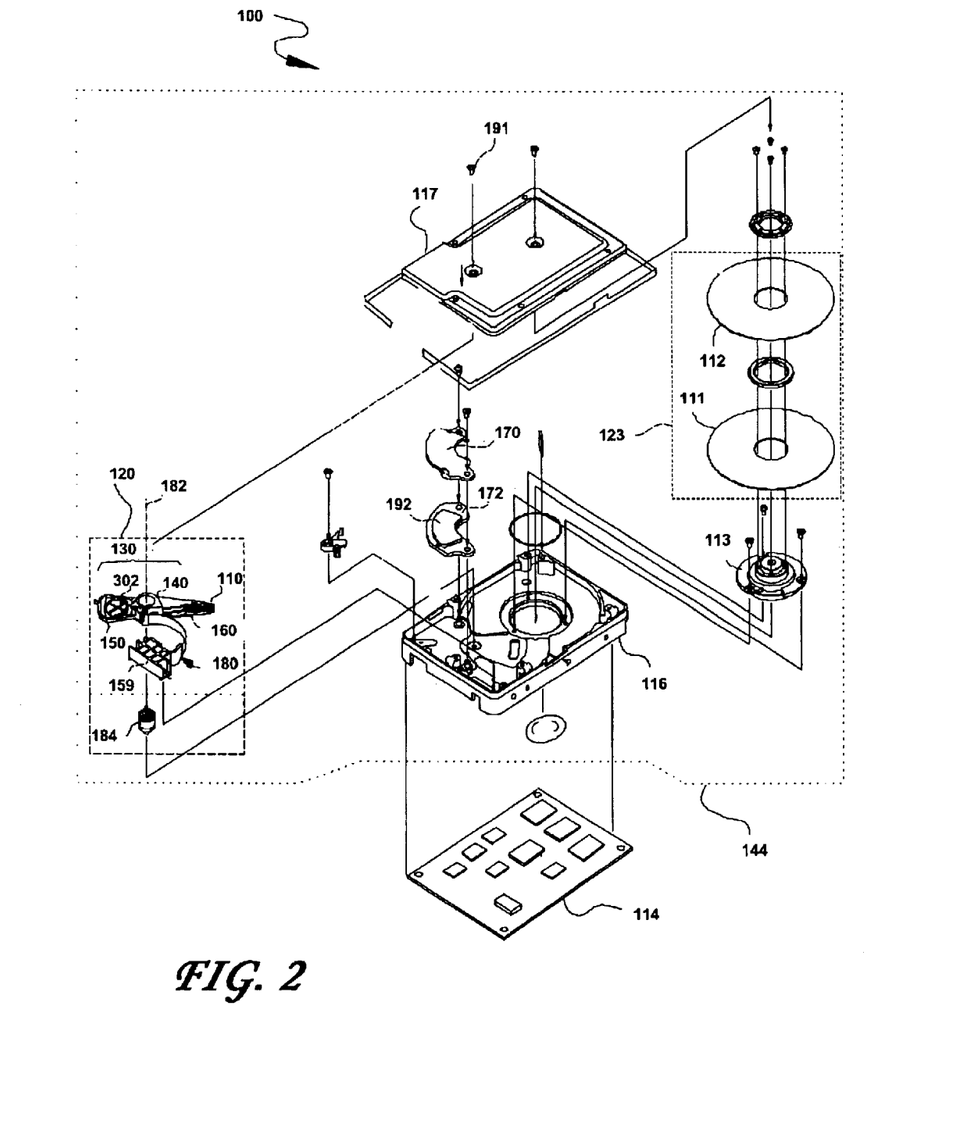
FIG. 2 is an exploded view of a disk drive incorporating a head stack assembly according to an embodiment of the present invention.

FIG. 2 shows the principal components of a magnetic disk drive 100 constructed in accordance with the present invention. With reference to FIG. 1, the disk drive 100 comprises a head disk assembly (HDA) 144 and a printed circuit board assembly (PCBA) 114. The HDA 144 includes a base 116 and a cover 117 attached to the base 116 that collectively house a disk stack 123 that includes a single magnetic disk or a plurality of magnetic disks (of which only a first disk 111 and a second disk 112 are shown), a spindle motor 113 attached to the base 116 for rotating the disk stack 123, a head stack assembly (HSA) 120, and a pivot bearing cartridge 184 that rotatably supports the HSA 120 on the base 116. The spindle motor 1113 rotates the disk stack 123 at a constant angular velocity. The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160 and supported by first and second actuator fork members, best shown in FIG. 3 at 304 and 306. A bobbin 302 may stiffen the coil portion 150 and includes one or more cleating features, as also described in detail below. The actuator arm 160 supports the HGA 110 that, in turn, supports slider(s) (not shown) for reading and writing to the disk(s) 11, 112. The flex cable assembly 180 may include a flex circuit cable and a flex bracket 159. The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 2 at reference numeral 182. The storage capacity of the HDA 144 may be increased by, for example, increasing the track density on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form a voice coil motor (VCM), and an actuator arm 160 that extends from an opposite side of the body portion 140 to support the HGA 110. The VCM causes the HSA 120 to pivot about the actuator pivot axis 182 and cause the slider and the read write transducers thereof to sweep radially over the disk(s) 111, 112.

Figure 3:
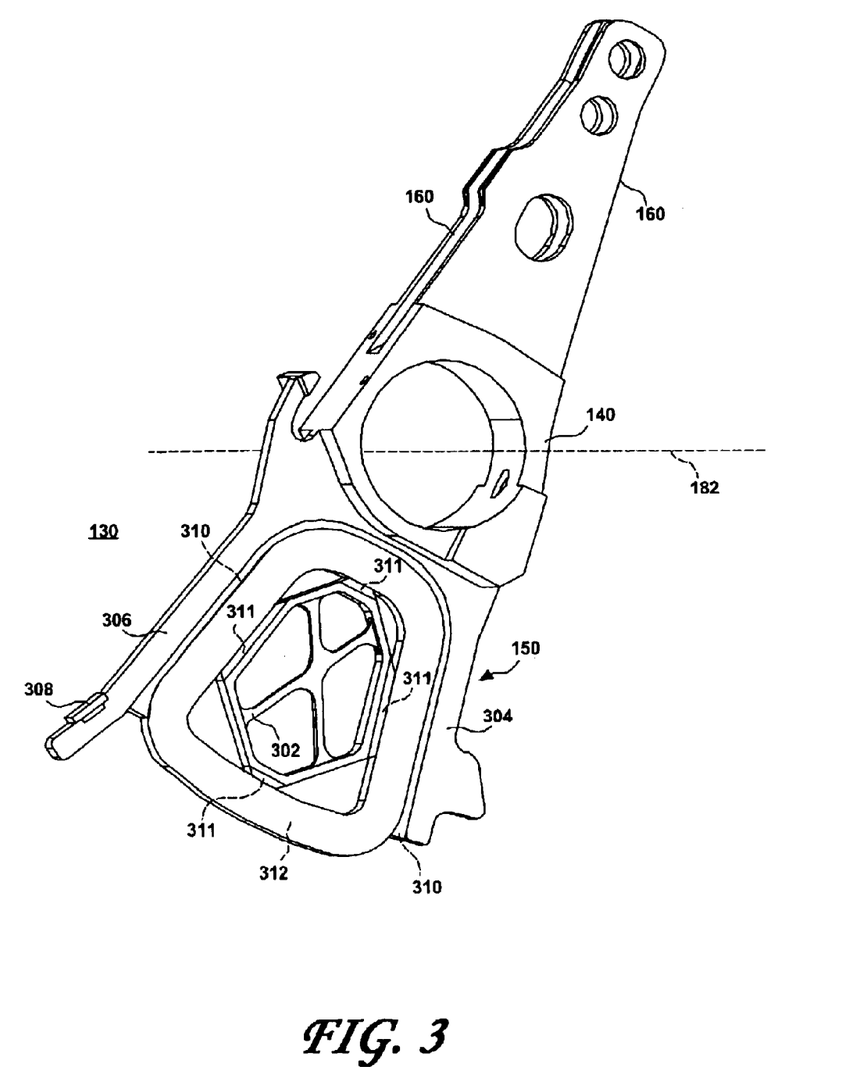
FIG. 3 shows a bottom perspective view of an actuator assembly according to an embodiment of the present invention.

FIG. 3 shows an actuator assembly 130 according to an embodiment of the present invention. As shown therein, the actuator assembly 130 includes a body portion 140 from which one or more actuator arms 160 are cantilevered. Cantilevered from the body portion in the opposite direction from the actuator arms 160 is a coil portion 150 that includes a first actuator fork member 304 and a second actuator fork member 306 that together support a coil 312. The coil 312 may be attached to the first and second actuator fork members 304, 306 by means of, for example, a layer of adhesive material 310. One of the first and second actuator fork members 302, 304 may include a tang 308 for use with a magnetic latch assembly, which tang 308 is attached to the first or second actuator fork member 304, 306.

To stiffen the wound coil 312, a bobbin 302 may be secured to or within the windings of the coil 312. The bobbin 302 may have any shape that is effective in increasing the rigidity of the coil portion 150 and/or the actuator assembly 130. In the exemplary embodiment shown in FIG. 3, the bobbin 302 is generally shaped as the letter "X", with the branches of the "X" shape supporting connecting bobbin members that define a first surface that faces the wound coil 312 (or a plurality of first surfaces that face the wound coil 312). Other shapes for the bobbin 302 may be devised. The bobbin 302 may be attached to the wound coil by means of, for example, one or more layers of adhesive 311 disposed between the first surface(s) of the bobbin 302 and the wound coil 312. As described relative to FIGS. 4–10, the first surface(s) of the bobbin 302 that faces the wound coil 312 includes or defines one or more cleating features that are configured to increase the surface area(s) of the first surface(s) of the bobbin 302.

Figure 4:
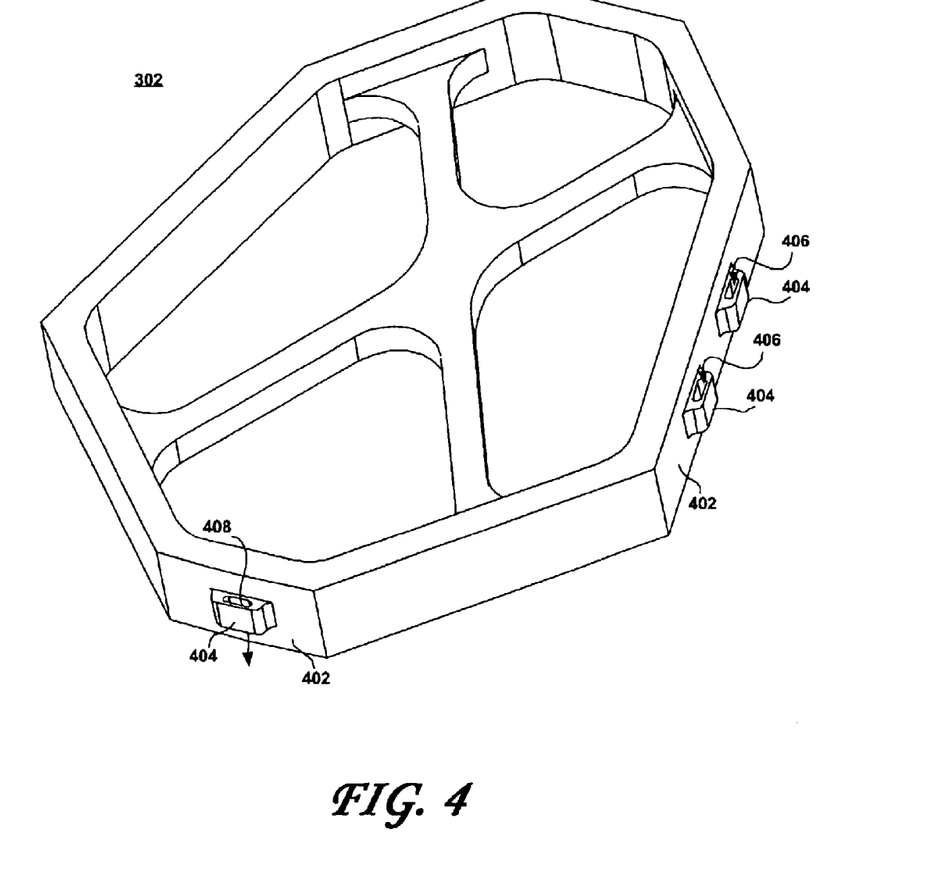
FIG. 4 shows a bobbin incorporating cleating features according to an embodiment of the present invention.

FIG. 4 shows the exemplary bobbin 302 that incorporates cleating features, according to an embodiment of the present invention. As shown, the exemplary bobbin 302 includes surfaces that bear against the inner periphery of the coil 312. The bobbin 302 may include a first surface 402 that faces the wound coil 312 and that defines the thickness of the bobbin 302. This first surface or surfaces 402, according to embodiments of the present invention, define one or more cleating features 404 that are configured to increase the surface area of the first surface or surfaces 402. According to an embodiment of the present invention, the largest dimension of each of the cleating feature or features, measured in a direction parallel to the pivot axis (reference numeral 182 in FIGS. 2 and 3) is less than the thickness of the bobbin 302. One or more layers of adhesive may be disposed between the first surface or surfaces 402 and the wound coil 312.

The cleating features 404 may have any shape that increases the surface area of the first surface 402. For example, one or more of the cleating features 402 may define an extrusion relative to the first surface 402 of the bobbin 302. Alternatively or in combination with the foregoing, one or more of the cleating features 404 may define a recess relative to the first surface 402 of the bobbin 302. The embodiment of FIG. 4 is one in which the cleating features 404 define extrusions relative to the surface or surfaces 402. The increase in surface area afforded by the cleating feature or features 404 enables the adhesive that secures the bobbin 302 to the wound coil 312 to be disposed over a larger area than would be the case in the absence of such cleating feature or features 404. In turn, this allows the bobbin 302 to be more rigidly secured to the wound coil 312 than would be possible had the first surface or surfaces 402 not included or defined such cleating feature or features 404. According to an embodiment of the present invention, the cleating feature or features 404 may define a through bore, labeled in FIG. 4 as numeral 406. The through bores 406 may be configured to enable an adhesive to flow therethrough before the adhesive cures, as suggested by arrow 408 in FIG. 4. Such through bores may, therefore, enable the formation of columns or veins of adhesive that act to further strengthen the adhesive bond between the bobbin 302 and the wound coil 312, and thus to increase the stiffness of the resulting actuator assembly 130. As shown in FIG. 4, one or more of the through bores 406 may defines a through bore axis that is substantially parallel to the pivot axis 182 shown in FIGS. 2 and 3. Alternatively or in addition to the configuration described in the preceding sentence, one or more of the through bores may define a through bore axis that is substantially perpendicular to the pivot axis 182. Alternatively still, one or more of the through bores 406 may define axes that have other orientations. The cleating feature or features 404 may be defined to be continuous or discontinuous on or within the first surface or surfaces 402.

Figures 5, 6:
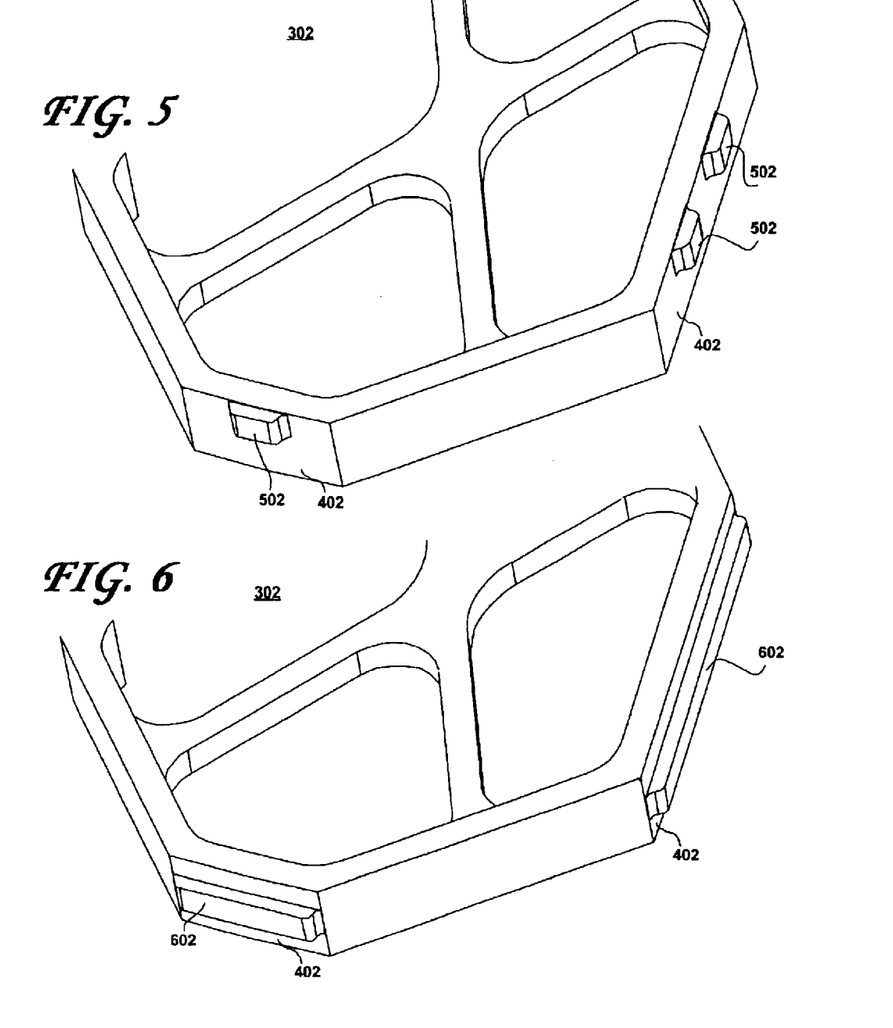
FIG. 5 shows a detail of a bobbin incorporating cleating features according to another embodiment of the present invention.
FIG. 6 shows a detail of a bobbin incorporating cleating features according to still another embodiment of the present invention.
Figure 7:
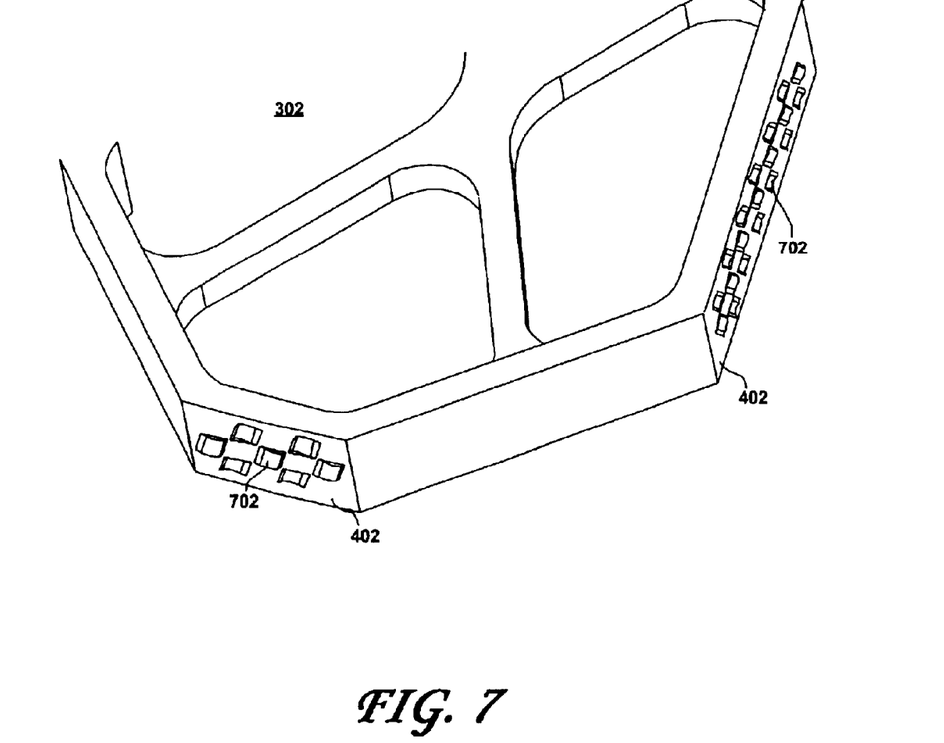
FIG. 7 shows a detail of a bobbin incorporating cleating features according to a further embodiment of the present invention.

FIG. 5 shows a detail of a bobbin incorporating cleating features according to another embodiment of the present invention. In this embodiment, one edge of at least one of the cleating features 502 is aligned with an edge of the first surface 402 of the bobbin 302. The cleating feature or features 404, 502 may be defined to be discontinuous on or within the first surface or surfaces 402, as shown in FIG. 4 or 5. Alternatively still, the cleating feature or features may be continuous, as shown at 602 in FIG. 6. Most any configuration of cleating features may be defined on the first surface(s) 402 of the bobbin 302. For example, the cleating features may be staggered and may include a combination of extrusions and recesses, as illustrated in FIG. 7. Those of skill in this art will recognize that other configurations of cleating features are possible.

Figure 8:
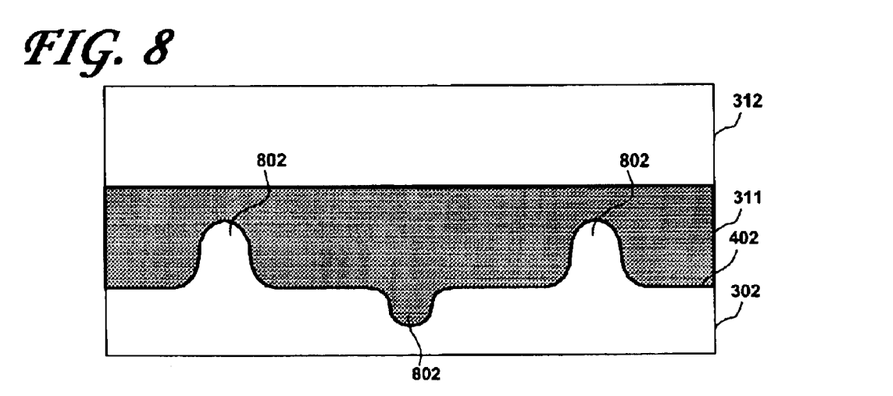
FIG. 8 is a cross-sectional view of an interface between a bobbin and a coil of a voice coil motor (VCM) of a disk drive according to yet another embodiment of the present invention.
Figure 9:
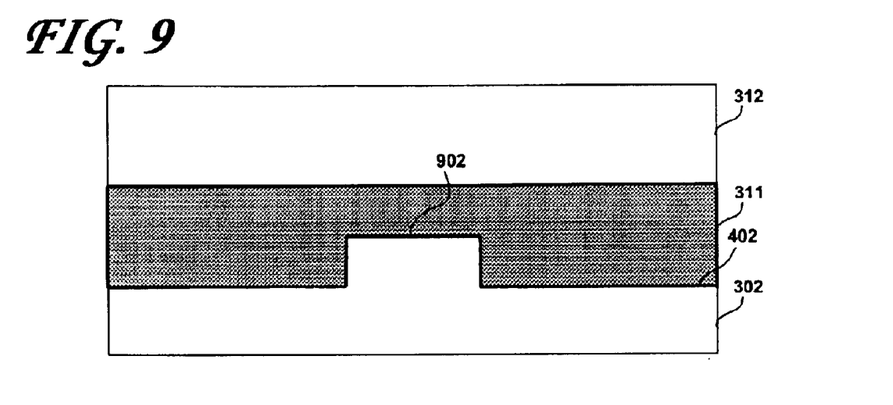
FIG. 9 is another cross-sectional view of an interface between a bobbin and a coil of a VCM of a disk drive according to another embodiment of the present invention.
Figure 10:
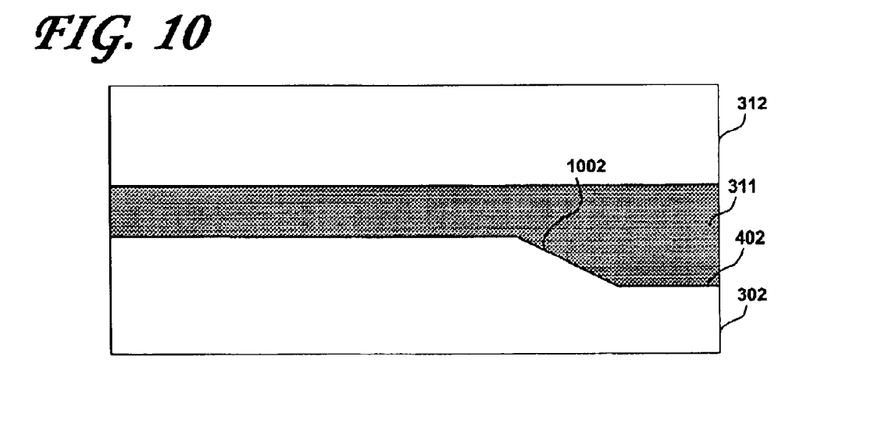
FIG. 10 is still another cross-sectional view of an interface between a bobbin and a coil of a VCM of a disk drive according to embodiment of the present invention.

FIGS. 8–10 show cross-sectional views of exemplary interfaces between the bobbin 302, the layer of adhesive 311 and the wound coil 312 of the disk drive's actuator coil portion. As shown in FIG. 8, the first surface 402 of the bobbin 302 may define cleating features 802 that may extrude or recess from the first surface 402. As clearly shown in FIG. 8, the presence of the cleating features 802 increases the surface area of the first surface 402. In turn, this increases the surface upon which the adhesive layer 311 may be disposed, thereby strengthening the bond between the bobbin 302 and the wound coil 312. The exemplary cleating features 802 of FIG. 8 are rounded, exhibiting smooth transitions between the relatively flatter first surface 402 and the cleating features 802. FIG. 9 is another exemplary cross-sectional view of the interface between the bobbin 302, the adhesive 311 and the wound coil 312. The exemplary cleating feature 902 shown therein has a rectangular cross-section. Other cross-sectional shapes are possible, as shown in FIG. 10, in which the cleating feature 1002 is aligned with an edge of the first surface 402 of the bobbin 302.

Advantageously, the cleating features of or on the bobbin 302 stiffen the coil portion 150 and correspondingly stiffen the actuator assembly 130. This enables the resonant mode frequencies of the actuator assembly to be shifted to higher frequencies and may enable the elimination or an attenuation of the detrimental effects of one or more of the resonant modes of the actuator assembly. Those of skill in the art may recognize that modifications of the embodiments disclosed herein are possible. For example, although the actuator assembly 130 of FIG. 3 is shown without an overmold around the free end of the wound coil 312, embodiments of the present invention may be combined with a plastic overmold to lend further rigidity to the coil portion 150 of the actuator assembly 130. Other modifications may occur to those of skill in this art, and all such modifications are deemed to fall within the purview of the present invention, as defined by the claims.

What is claimed is:

1. A disk drive, comprising:
   a disk;
   a head stack assembly for reading and writing to the disk, the head stack assembly comprising:
      a body portion defining a through bore that defines a pivot axis;
      an actuator arm cantilevered from the body portion;
      a head gimbal assembly coupled to the actuator arm;
      a coil portion cantilevered from the body portion in an opposite direction from the actuator arm, the coil portion defining first and second actuator fork members and including a wound coil supported by the first and second actuator fork members;
      a bobbin configured to stiffen the wound coil, the bobbin including a first surface that faces the wound coil and that defines a thickness of the bobbin, the first surface defining a plurality of cleating features configured to increase a surface area of the first surface, a largest dimension of each of the plurality of cleating features in a direction parallel to the pivot axis being less than the thickness of the bobbin, and
      an adhesive disposed between the first surface of the bobbin and the wound coil.

2. The disk drive of claim 1, wherein the cleating feature defines a through bore configured to allow the adhesive to flow therethrough.

3. The disk drive of claim 2, wherein the through bore defines a through bore axis that is substantially parallel to the pivot axis.

4. The disk drive of claim 2, wherein the through bore defines a through bore axis that is substantially perpendicular to the pivot axis.

5. The disk drive of claim 1, wherein at least one of the plurality of cleating features defines an extrusion relative to the first surface of the bobbin.

6. The disk drive of claim 1, wherein at least one of the plurality of cleating features defines a recess relative to the first surface of the bobbin.

7. The disk drive of claim 1, wherein one edge of at least one of the plurality of cleating features is aligned with an edge of the first surface of the bobbin.

8. The disk drive of claim 1, wherein at least one of the plurality of cleating features is disposed between two substantially flat portions of the first surface.

9. A head stack assembly for reading and writing to a disk of a disk drive, comprising:
   a body portion defining a through bore that defines a pivot axis;
   an actuator arm cantilevered from the body portion;
   a head gimbal assembly coupled to the actuator arm;
   a coil portion cantilevered from the body portion in an opposite direction from the actuator arm, the coil portion defining first and second actuator fork members and including a wound coil supported by the first and second actuator fork members;
   a bobbin configured to stiffen the wound coil, the bobbin including a first surface that faces the wound coil and that defines a thickness of the bobbin, the first surface defining a plurality of cleating features configured to increase a surface area of the first surface, a largest dimension of each of the plurality of cleating features in a direction parallel to the pivot axis being less than the thickness of the bobbin, and
   an adhesive disposed between the first surface of the bobbin and the wound coil.

10. The head stack assembly of claim 9, wherein the cleating feature defines a through bore configured to allow the adhesive to flow therethrough.

11. The head stack assembly of claim 10, wherein the through bore defines a through bore axis that is substantially parallel to the pivot axis.

12. The head stack assembly of claim 10, wherein the through bore defines a through bore axis that is substantially perpendicular to the pivot axis.

13. The head stack assembly of claim 9, wherein at least one of the plurality of cleating features defines an extrusion relative to the first surface of the bobbin.

14. The head stack assembly of claim 9, wherein at least one of the plurality of cleating features defines a recess relative to the first surface of the bobbin.

15. The head stack assembly of claim 9, wherein one edge of at least one of the plurality of cleating features is aligned with an edge of the first surface of the bobbin.

16. The head stack assembly of claim 9, wherein at least one of the plurality of cleating features is disposed between two substantially flat portions of the first surface.

17. An actuator arm assembly for a disk drive, comprising:
   a body portion defining a through bore that defines a pivot axis;
   an actuator arm cantilevered from the body portion;
   a coil portion cantilevered from the body portion in an opposite direction from the actuator arm, the coil portion defining first and second actuator fork members and including a wound coil supported by the first and second actuator fork members;
   a bobbin configured to stiffen the wound coil, the bobbin including a first surface that faces the wound coil and that defines a thickness of the bobbin, the first surface defining a plurality of cleating features configured to increase a surface area of the first surface, a largest dimension of each of the plurality of cleating features in a direction parallel to the pivot axis being less than the thickness of the bobbin, and
   an adhesive disposed between the first surface of the bobbin and the wound coil.

18. The actuator arm assembly of claim 17, wherein the cleating feature defines a through bore configured to allow the adhesive to flow therethrough.

19. The actuator arm assembly of claim 18, wherein the through bore defines a through bore axis that is substantially parallel to the pivot axis.

20. The actuator arm assembly of claim 18, wherein the through bore defines a through bore axis that is substantially perpendicular to the pivot axis.

21. The actuator arm assembly of claim 17, wherein at least one of the plurality of cleating features defines an extrusion relative to the first surface of the bobbin.

22. The actuator arm assembly of claim 17, wherein at least one of the plurality of cleating features defines a recess relative to the first surface of the bobbin.

23. The actuator arm assembly of claim 17, wherein one edge of at least one of the plurality of cleating features is aligned with an edge of the first surface of the bobbin.

24. The actuator arm assembly of claim 17, wherein at least one of the plurality of cleating features is disposed between two substantially flat portions of the first surface.

* * * * *